C. STANLEY.
FISHING REEL.
APPLICATION FILED OCT. 18, 1912.
1,087,149.
Patented Feb. 17, 1914.
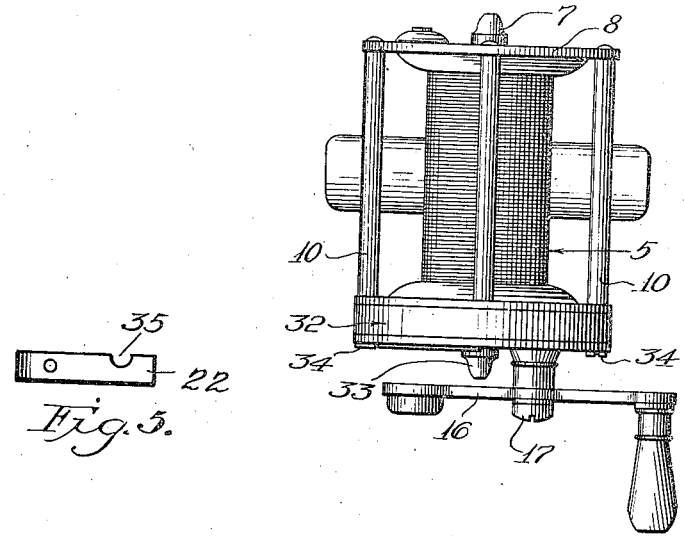
Fig. 1
Fig. 5.
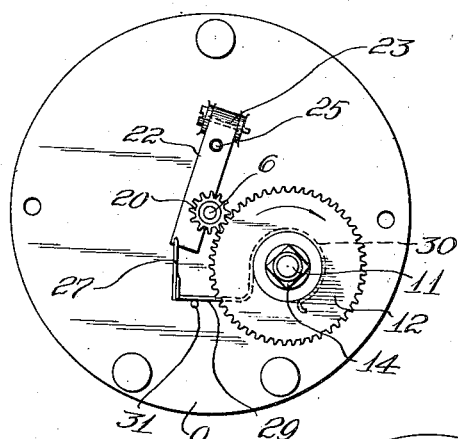
Fig. 2
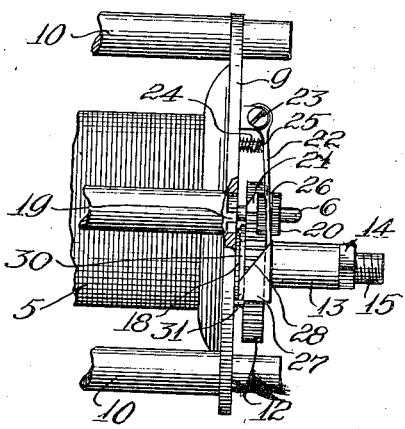
Fig. 3
Fig. 4
Witnesses:
Harry S. Gaither
Thomas A. Banning Jr.
Inventor:
Charles Stanley
by Banning & Banning
Attys

UNITED STATES PATENT OFFICE.

CHARLES STANLEY, OF CHICAGO, ILLINOIS.

FISHING-REEL.

1,087,149.

Specification of Letters Patent. Patented Feb. 17, 1914.

Application filed October 18, 1912. Serial No. 726,548.

*To all whom it may concern:*

Be it known that I, CHARLES STANLEY, a citizen of the United States, residing at Chicago, in the county of Cook and State of Illinois, have invented certain new and useful Improvements in Fishing-Reels, of which the following is a specification.

The present invention relates to certain improvements in fishing reels, and particularly of that type intended to be used in casting. In casting from the pole—commonly known as bait casting,—the pole is given a sudden switch or throw so that the weight of the hook and sinker, and of any other devices on the line, serves to run off the desired length of line from the reel. Therefore, in order to secure the best results in cast fishing, the reel should be so constructed that the line can be run off with the least possible impediment and friction. Furthermore, the reel should be so constructed that it will be practically silent in its operation so as not to scare the fish.

Where the winding gears and handle are constantly in mesh with the line spool, said gears and handle must rotate as the line is run off from the spool. This throws a considerable burden on the spool when the reel is used for casting, with the result that the difficulty of throwing off the desired length of line is greatly increased, and that a loud noise is generated every time that a cast is made.

The main object of the present invention is to provide a clutch between the winding handle and the spool, so that during a cast the spool can run entirely free and disconnected from the gearing, but so that whenever the winding handle is turned in the proper direction the clutch will be automatically brought into play for the purpose of driving the spool to wind up the line. By using such a construction the spool is normally free to rotate absolutely unimpeded, but any rotation of the handle in the proper direction to wind will bring the clutch into action so that the spool will be driven.

Other objects and uses will appear from a detailed description of the invention which consists in the features of construction and combination of parts, hereinafter described and claimed.

In the drawings, Figure 1 shows a plan view of the assembled reel; Fig. 2 shows an enlarged end view of the reel with the handle and cap removed; Fig. 3 is a side view corresponding to Fig. 2; Fig. 4 is an end view of the spool and clutch block also on enlarged scale; and Fig. 5 is a detail view of the plate 22.

In the several figures, the spool is designated by the numeral 5. It has a center shaft 6 which is journaled in the end journal 7 of the end plate 8, and in a journal adjacent to the front plate 9. These plates can be rigidly joined together by means of cross rods 10. A pin 11 is secured to the end plate 9 and serves as a journal for the main driving gear 12. The latter has the upwardly extending sleeve 13 which terminates in the squared portion 14 and threaded portion 15 to which may be secured the driving handle 16 by means of a cap nut 17. A shoulder or boss 18 is formed on the lower end of the driving gear, the function of which shoulder will be presently explained.

The spool is provided with a clutch block 19 having squared portions which are adapted to be engaged by a driving member when it is desired to drive the spool through the medium of the handle. A driving pinion 20 is slidably mounted on the extending end portion of the shaft 6, said pinion being constantly in mesh with the main gear 12. Said pinion has on its lower face squared portions 21 which are adapted to engage the clutch block 19 for the purpose of driving the same to rotate the spool when the driving handle is rotated. The pinion is normally held away from the clutch block but means are provided for carrying the pinion down to bring its squared portions into engagement with the clutch block when the handle is rotated.

The pinion is normally held up out of clutch from the spool as illustrated in Fig. 3. Under these circumstances the spool can run freely and absolutely unobstructed by the gearing, so that when a cast is to be made the spool will not be burdened with the necessity of driving the several gears. Means are however provided for carrying the pinion into clutch with the spool as soon as a driving force is exerted on the main handle 16. As one means for accomplishing this result I pivot a plate 22 to the plate 9 at the point 23 and keep said plate 22 normally raised by means of a spring 24. This spring preferably surrounds a pin 25 secured to the plate 9 and extending to or through the plate 22, which pin 25 serves to guide the spring in its movements. The plate 22 engages an annular notch 26 of the pinion so that the rising and falling of the pinion is determined by the movements of the plate 22. It will be seen that the spring serves to normally hold the pinion up out of clutch from the spool.

A cam member 27 having a cam face 28 engaging the plate 22 is adapted to be advanced during the first movement of the driving handle for the purpose of depressing the plate 22 against the force of the spring, thus bringing the pinion into clutch with the spool during the first movement of the driving handle. To accomplish this result the member 27 has a friction member which is connected to the main gear and which friction member does not slip until the plate 22 has been depressed. As a simple means for accomplishing this result the plate 27 is connected to an arm 29 which has its end portion 30 encircling the hub portion 18 so that as soon as the main gear is rotated the plate 27 will be advanced and the plate 22 lowered to carry the pinion into clutch with the spool. A pin 31 limits the backward movement of the spring member 29 so that the cam face 28 will always stand in position ready to lower the plate 22 when a driving force is exerted on the main gear.

As a simple means for inclosing the above mechanism I provide a cap 32 which has a journal 33 for supporting the end of the shaft 6, and which cap 32 supports the projecting end of the rods 10 to which it may be secured by means of screws 34.

It is found that by means of the above construction the pinion will come into clutch with the spool after an extremely small movement of the driving handle and main gear, and that the additional burden imposed on the operation of the reel by means of the friction of the spring wire 29 is practically negligible. Of course, as soon as the pinion has been carried into clutch with the spool the friction wire slips behind the main gear, but as just stated the friction thus imposed is negligible.

Fig. 5 shows in detail the plate 22, and shows particularly the notch 35, which accommodates the shaft 6.

By reason of the fact that the pinion is always in mesh with the main gear there is no possibility of locking the mechanism by failure of the pinion teeth to register with those of the main gear. As soon as the driving handle is rotated the pinion commences to rotate and is simultaneously advanced toward the clutch block of the spool. When a sufficient advancement has taken place the faces 21 of the pinion will engage the squared faces of the clutch block and the spool will be rotated. As soon as the driving force is removed from the handle the spring 24 will raise the plate 22 so that the pinion will again be carried away from the spool and the latter will again be absolutely free to rotate.

Obviously, many changes of construction may be adopted without departing from the spirit of my invention, and I do not limit myself to the construction shown, except as called for in the claims, but include within the scope of my invention any equivalent mechanism for accomplishing an equivalent result.

I claim:

1. In a device of the class described, the combination with a spool and a main gear, of a pinion constantly in mesh with the main gear, a clutching element on the spool, a clutching element on the pinion adapted at times to engage the clutching element on the spool, a slidable mounting for the pinion whereby the same may be advanced into and out of clutching engagement with the spool, an oscillatable plate mounted in position to engage the pinion for sliding the same into and out of clutching engagement with the spool, an oscillatable cam plate mounted in position to engage the first mentioned oscillatable plate, a friction member connected to the cam plate and mounted in engagement with the main gear, and a spring for restoring the first mentioned oscillatable plate to normal position for the purpose of unclutching the pinion from the spool, substantially as described.

2. In a device of the class described, the combination with a spool and a main gear, of a pinion constantly in mesh with the main gear, a slidable mounting for the pinion, there being clutch faces on the pinion and on the spool whereby the pinion may be slid into and out of clutching engagement with the spool, a friction member carried by the main gear, a cam plate carried by the friction member, an operative connection between said cam plate and the pinion whereby the pinion is forced into clutching engagement with the spool when the main gear is operated, and means for normally forcing the pinion away from the spool for the purpose of unclutching the pinion from the spool, substantially as described.

3. In a device of the class described, the combination with a spool and a main gear of a pinion adapted to mesh with the main gear, a slidable mounting for the pinion, there being clutch faces on the pinion and on the spool whereby a driving connection may be established between the pinion and the spool, an oscillatable plate, a pivoted mounting for the same, an operative connection between the oscillatable plate and the pinion whereby the position of the pinion is dependent upon the position of the oscillatable plate, a spring for normally raising the oscillatable plate to carry the pinion out of clutch from the spool, a friction member in engagement with the main gear, and an operative connection between the friction member and the oscillatable plate for the purpose of depressing the latter against the force of the spring to carry the pinion into clutch with the spool when the main gear is rotated, substantially as described.

CHARLES STANLEY.

Witnesses:
 THOMAS A. BANNING, Jr.,
 FRANCES M. FROST.